United States Patent [19]

Kröger et al.

[11] Patent Number: 5,738,197
[45] Date of Patent: Apr. 14, 1998

[54] FREEWHEEL HUB FOR BICYCLES

[75] Inventors: Peter Kröger, Schweinfurt; Klaus König, Mühlhausen; Guillaume Crosnier, Bergrheinfeld, all of Germany

[73] Assignee: Fichtel & Sachs AG, Schweinfurt, Germany

[21] Appl. No.: 653,955

[22] Filed: May 22, 1996

[30] Foreign Application Priority Data

May 22, 1995 [DE] Germany .................. 195 18 676.1

[51] Int. Cl.⁶ .................................................. F16D 41/30
[52] U.S. Cl. .................................................. 192/64; 192/46
[58] Field of Search ................... 192/64, 46; 301/105.1, 301/110.5

[56] References Cited

U.S. PATENT DOCUMENTS

| | | |
|---|---|---|
| 4,567,973 | 2/1986 | Butz .................................. 192/64 |
| 4,580,670 | 4/1986 | Nagano .............................. 192/64 |
| 5,443,279 | 8/1995 | Nürnberger . |
| 5,458,223 | 10/1995 | Chen .................................. 192/64 |
| 5,527,230 | 6/1996 | Meier-Burkamp . |
| 5,540,456 | 7/1996 | Meier-Burkamp et al. . |

FOREIGN PATENT DOCUMENTS

| | | |
|---|---|---|
| 3204685 | 8/1983 | Germany . |
| 441602 | 1/1936 | United Kingdom ............ 192/64 |
| 2128273 | 4/1984 | United Kingdom ............ 192/64 |

*Primary Examiner*—Richard M. Lorence
*Attorney, Agent, or Firm*—Nils H. Ljungman and Associates

[57] ABSTRACT

A freewheel hub for bicycles to provide propulsion by means of a plurality of sprockets when a derailleur is used. A sprocket or gear carrier transmits the rotational forces introduced to the sprockets mounted on the sprocket carrier by means of a drive sleeve, a ratchet and a pawl carrier to a hub sleeve in the direction of rotation of the drive, whereby the ratchet represents a freewheel in the opposite direction of rotation. The propulsion unit, which consists of the sprocket carrier and the drive sleeve, is divided into two parts, and can therefore be manufactured easily with regard to its driving gearings and pawl gearing.

10 Claims, 2 Drawing Sheets

FREEWHEEL HUB FOR BICYCLES

BACKGROUND OF THE INVENTION

1. Field of the Invention

This invention generally relates to a freewheel hub for bicycles, consisting of a hub axle, a hub sleeve, a plurality of roller bearings and a gear or sprocket carrier with driving gearing. The freewheel hub also includes a pawl carrier which is connected to the hub sleeve. At least one detent pawl is located on the pawl carrier for the transmission of the drive moments from the sprocket carrier to the hub sleeve.

2. Background Information

German Patent No. 32 04 685 A1 discloses a freewheel hub for bicycles, on which the detent pawls are located in the hub sleeve and are engaged toward the radial inside in a matching detent which consists of axial grooves, whereby these grooves simultaneously act as driving grooves for slip-on sprockets which are attached non-rotationally. Apart from the advantage of economical manufacture, one disadvantage is that such an arrangement can include a relatively large amount of dead travel from one driving groove or tooth to another. A relatively large amount of dead travel can occur since the driving grooves for the slip-on sprockets are generally located at larger angular intervals from one another than are the conventional teeth of a locking gearing oriented especially for a pawl lock. Moreover, such a solution results in a larger hub diameter than usual, at least on the sprocket side, which means that the spoke flanges must have excessively large diameters.

OBJECT OF THE INVENTION

The object of the present invention is to create a freewheel hub with a drive sleeve for the fastening of a plurality of sprockets. The freewheel hub has conventional or correct pawl gearing at the point of the force transmission by means of detent pawls from the drive sleeve to the hub sleeve, whereby both the pawl gearing and the driving gearing on the drive sleeve can be fabricated or manufactured without the need for cutting operations. That is, the object of the present invention is to create a freewheel hub that can be manufactured economically and simply.

SUMMARY OF THE INVENTION

The present invention teaches that this object can be accomplished by non-rotationally connecting the inner driving gearing, at one end of the drive sleeve, to the driving gearing of the sprocket carrier. The drive sleeve and the sprocket carrier are therefore connected, such that the inner driving gearing of the drive sleeve interacts or meshes with the driving gearing of the sprocket carrier. The drive sleeve can then be axially fixed in position, in one direction, by means of a recess on the drive sleeve which is in contact with a collar means on the sprocket carrier.

That is, the (bicycle) sprocket carrier part and the drive sleeve part can be advantageously combined to form a two-part bicycle drive assembly part, using a simplified manufacturing process. The drive sleeve, including both pawl gearing (or internal cogs) and inner driving gearing (or inner driving projection) features, can easily and economically be manufactured using a cold pressing, cold molding or extrusion (pressing) process, with only minor machining required to complete the drive sleeve part. The sprocket carrier, having driving gearing (or outer driving projections), can also be easily and economically manufactured using the cold pressing, cold molding or extrusion process. Again, only minor machining should be required to produce the completed sprocket carrier part. Since a significant portion of the features to be manufactured into both the sprocket carrier and drive sleeve can be performed using the simple and economical plastic deformation (cold pressing, cold molding or extrusion) processes, the manufacturing of the drive part can be both easy and economical. That is, high cost machining or material removal from the parts (sprocket carrier and drive sleeve) can be reduced since the low cost plastic deformation process can provide parts with the requisite shape and tolerances so that only minimal machining should be required to complete the finished parts.

In accordance with one embodiment of the present invention, a freewheel hub for a bicycle can have a sprocket, carrier, a drive sleeve and a hub sleeve. The sprocket carrier can preferably have driving gearing for mounting and non-rotationally fastening sprockets, which can be driven by a chain. The sprocket carrier, on its end closer to the middle of the freewheel hub, can have a collar which preferably extends circumferentially around the end of the sprocket carrier. The driving gearing on the sprocket carrier can preferably reach its axial end at the collar. The drive sleeve can have inner driving gearing, on its smallest diameter, which can fit together or mesh with the external driving gearing of the sprocket carrier. The drive sleeve can be slid onto and non-rotationally connected to the sprocket carrier after aligning or meshing the driving gearing of the sprocket carrier with the inner driving gearing of the drive sleeve. A recess on the drive sleeve can be aligned against the collar of the sprocket carrier. That is, the drive sleeve can be slid onto the sprocket carrier until the recess of the drive sleeve contacts the collar of the sprocket carrier. An outer edge of a first gasket or retaining ring can preferably be disposed against the end surface of the drive sleeve to hold the drive sleeve in place against the collar of the sprocket carrier. An inside edge of the retaining ring can be disposed in a groove in the driving gearing. In this way, the drive sleeve can be fixed in position, in the axial direction, toward the center of the freewheel hub. The drive sleeve can also have a groove for a second gasket on its largest diameter. A second gasket can be disposed in the groove. A sealing lip of the second gasket can extend against an inner cylindrical surface of the hub sleeve to prevent dirt from penetrating inside the freewheel hub. Therefore, the combination of the drive sleeve and the sprocket carrier can form a two-part drive part disposed at one end of the freewheel hub.

One aspect of the invention resides broadly in a bicycle freewheel hub, the bicycle freewheel hub comprising: a hub axle defining a longitudinal axis; a hub sleeve; bearings for mounting the hub sleeve on the hub axle; a bicycle sprocket carrier for receiving bicycle sprockets; the bicycle sprocket carrier having outer driving projections to mesh with bicycle sprockets; a pawl carrier connected to the hub sleeve; at least one detent pawl disposed on the pawl carrier; a drive sleeve having inner driving projections; the inner driving projections of the drive sleeve being configured to non-rotationally mesh with the outer driving projections of the bicycle sprocket carrier; the bicycle sprocket carrier comprising a collar device; the drive sleeve comprising a recess device; the drive sleeve being axially fixed in position, in a first axial direction with respect to the longitudinal axis of the hub axle, by the recess device of the drive sleeve; and the recess device being disposed in contact with the collar device of the bicycle sprocket carrier.

Another aspect of the invention resides broadly in a bicycle drive assembly comprising: a bicycle sprocket carrier for receiving bicycle sprockets; the bicycle sprocket carrier having a longitudinal axis; the bicycle sprocket carrier having outer driving projections to mesh with bicycle sprockets; a drive sleeve having inner driving projections; the inner driving projections of the drive sleeve being configured to non-rotationally mesh with the outer driving projections of the bicycle sprocket carrier; the bicycle sprocket carrier comprising a collar device; the drive sleeve comprising a recess device; the drive sleeve being axially fixed in position, in a first axial direction with respect to the longitudinal axis of the bicycle sprocket carrier, by the recess device of the drive sleeve; and the recess device being disposed in contact with the collar device of the bicycle sprocket carrier.

Another aspect of the invention resides in a method of making a bicycle freewheel hub comprising: a hub axle defining a longitudinal axis; a hub sleeve; bearings for mounting the hub sleeve on the hub axle; a bicycle sprocket carrier for receiving bicycle sprockets; the bicycle sprocket carrier having outer driving projections to mesh with bicycle sprockets; a pawl carrier connected to the hub sleeve; at least one detent pawl disposed on the pawl carrier; a drive sleeve having inner driving projections; the inner driving projections of the drive sleeve being configured to non-rotationally mesh with the outer driving projections of the bicycle sprocket carrier; the bicycle sprocket carrier comprising a collar device; the drive sleeve comprising a recess device; the drive sleeve being axially fixed in position, in a first axial direction with respect to the longitudinal axis of the hub axle, by the recess device of the drive sleeve; and the recess device being disposed in contact with the collar device of the bicycle sprocket carrier; the method comprising the steps of: forming the drive sleeve; the step of forming the drive sleeve comprising pressing a billet to at least form a portion of the drive sleeve and forming the inner driving projections, the internal cogs and the recess device on the drive sleeve; forming the bicycle sprocket carrier; the step of forming the bicycle sprocket carrier comprising pressing a billet to at least form a portion of the bicycle sprocket carrier and forming the outer driving projections and the collar device on the bicycle sprocket carrier; aligning the inner driving projections of the drive sleeve with the outer driving projections of the bicycle sprocket carrier; sliding the drive sleeve onto the bicycle sprocket carrier; and engaging the recess device of the drive sleeve with the collar device of the bicycle sprocket carrier.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to at least one embodiment illustrated in the accompanying drawings, in which.

DESCRIPTION OF THE PREFERRED EMBODIMENT

Figure 1:
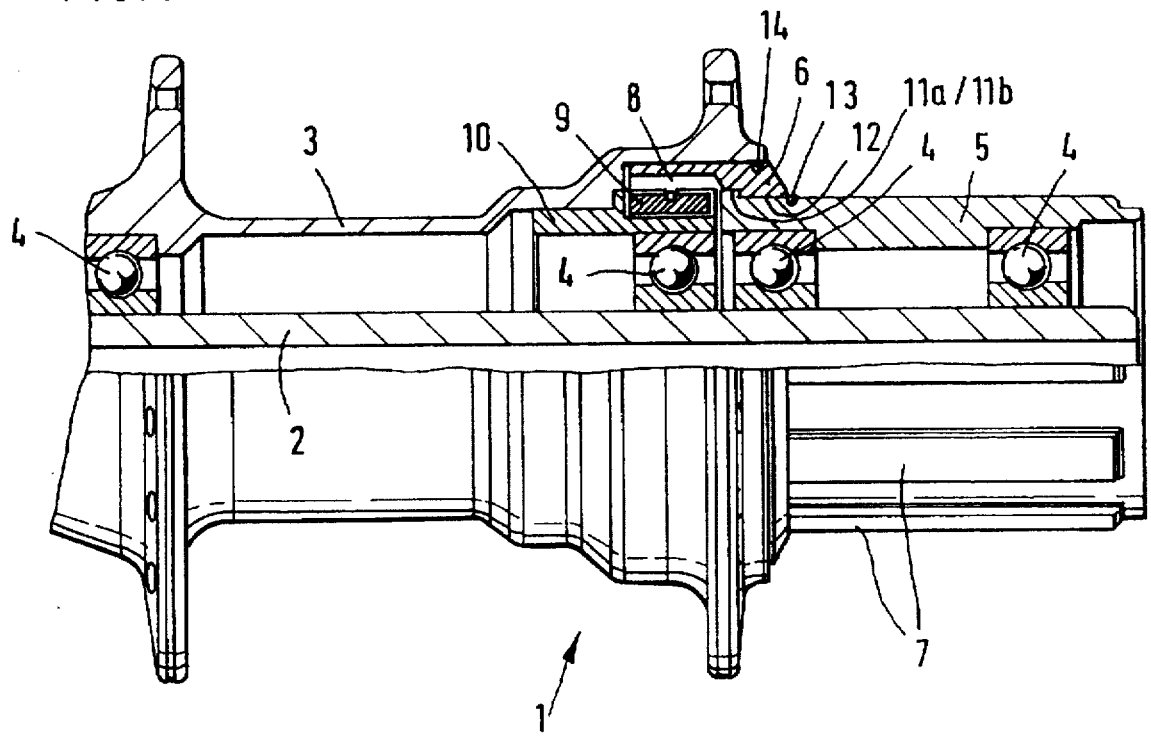
FIG. 1 shows a partial section of a freewheel hub with a sprocket carrier and a drive sleeve in partial section.

FIG. 1 shows a freewheel hub 1 which includes a hub axle 2, a hub sleeve 3, a pawl carrier 10 which is firmly connected to the hub sleeve 3, at least one detent pawl 9, a plurality of ball bearings 4, a sprocket carrier 5 for fastening a plurality of sprockets (not shown here), as well as a drive sleeve 6 with a pawl gearing 8. For fastening the sprockets, the: drive sleeve 6 has a driving gearing 7, which on the end closer to the middle of the freewheel hub 1 has a collar 11a. The collar 11a is round, and the driving gearing 7 ends at this point.

Figure 2:
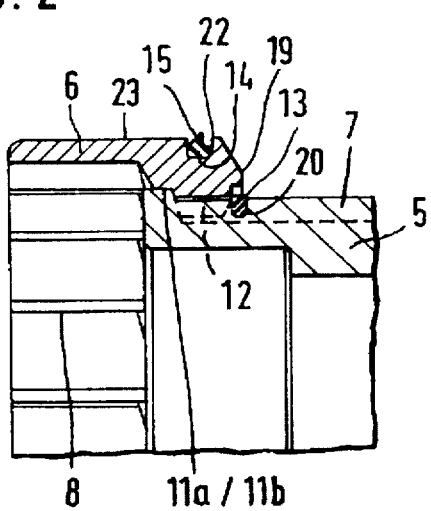
FIG. 2 shows the sprocket carrier and the drive sleeve with two gaskets as an enlarged detail.
Figure 3:
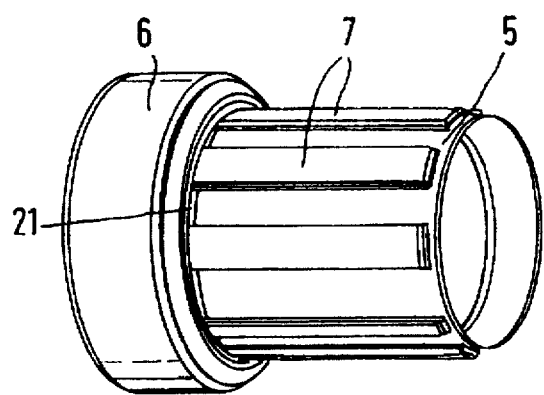
FIG. 3 shows the above-mentioned parts in a perspective view.

In accordance with one embodiment of the present invention, as shown in FIGS. 2 and 3, the drive sleeve 6 can be attached to the sprocket carrier 5. The sprocket carrier 5 can preferably have driving gearing 7 for mounting and non-rotationally fastening sprockets (not shown here). The sprocket carrier 5, on its end closer to the middle of the freewheel hub 1, can have a collar 11a which preferably extends circumferentially around the end of the sprocket carrier 5. The driving gearing 7 on the sprocket carrier 5 can preferably reach its axial end at the collar 11a. The drive sleeve 6, on its smallest diameter, can have an inner driving gearing 12, which can fit together or mesh with the external driving gearing 7 of the sprocket carrier 5. The drive sleeve 6 can therefore be slid onto and non-rotationally connected to the sprocket carrier 5 after aligning or meshing the driving gearing 7 of the sprocket carrier 5 with the inner driving gearing 12 of the drive sleeve 6. A recess 11b on the drive sleeve 6 can be aligned against the collar 11a of the sprocket carrier 5. That is, the drive sleeve 6 can slide over the sprocket carrier 5, from right to left as shown in FIGS. 2 and 3, until the recess 11b of the drive sleeve 6 comes into contact with the collar 11a of the sprocket carrier 5. A first gasket or retaining ring 13 can fix the drive sleeve 6 in the position described above by means of its position on an end surface 19 of the drive sleeve 6. The first gasket 13 can be disposed in a groove 20 in the driving gearing 7. In this way the drive sleeve 6 can be fixed in position, in the axial direction, toward the center of the freewheel hub 1. The purpose of the first gasket 13 is not only to fix the drive sleeve 6 in its position indicated above, but also to prevent the penetration of dirt into the gap 21 in the driving gearing. The drive sleeve 6, on its largest diameter 23, has a groove 22 for a second gasket 14, which extends or runs by means of a sealing lip 15 against an inner cylindrical surface of the hub sleeve 3. The second gasket 14 can prevent dirt from penetrating inside the freewheel hub 1.

When the sprocket carrier 5 is being driven or provided with torque by the sprockets (not shown here), the drive sleeve 6 is driven by means of the driving gearing 7 and inner driving gearing 12. The drive sleeve 6 transmits this torque by means of the pawl gearing 8, the detent pawls 9 and the pawl carrier 10 directly to the hub sleeve 3. This transmission of force occurs in the direction of the drive. On the other hand, when the direction of the drive is reversed, that is, when the sprocket carrier 5 of bicycle is driven or travelling in reverse, the detent pawls 9 are overridden and the wheel or sprocket carrier 5 previously driven continues to turn at idle, as long as the bicycle moves in the direction of travel.

Figure 4:
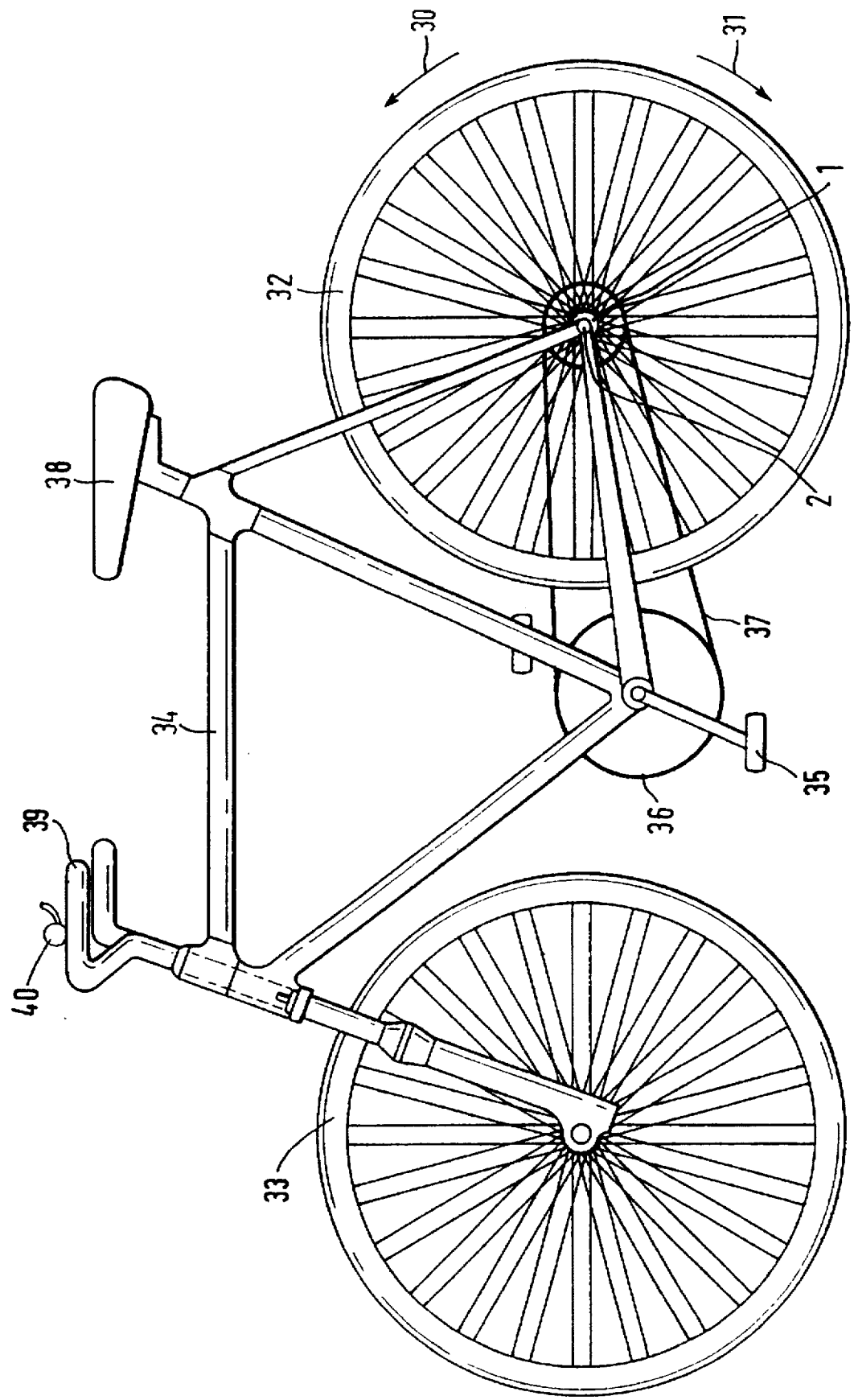
FIG. 4 generally shows a bicycle with a freewheel hub.

That is, for example, counterclockwise rotational force or torque can be transmitted from the sprockets (not shown here) to the sprocket carrier 5, causing the drive sleeve 6 to rotate in a counterclockwise direction 30 (FIG. 4). Because the sprocket carrier 5 is non-rotationally connected to the drive sleeve 6, the sprocket carrier 5 can transmit torque and the corresponding counterclockwise rotation 30 to the drive sleeve 6. This torque and counterclockwise rotation 30 can then be transmitted through the pawl gearing 8 of the drive sleeve 6, to the pawls 9 carried on the pawl carrier 10. The pawls 9 and pawl gearing 8 essentially function as a ratchet mechanism. The pawl gearing 8 can engage with the pawls 9 to enable the pawl carrier 10 to transmit torque and counterclockwise rotation 30 to the hub sleeve 3. Finally, the torque and counterclockwise rotation 30 of the hub sleeve 3 can be transmitted to a rear wheel 32 of a bicycle, causing movement of the bicycle. Summarizing, the pawls 9 can be engaged with the pawl gearing 8 for enabling the sprocket carrier 5 to drive or rotate the hub sleeve 3 in the counterclockwise direction 30, for example, but the sprocket carrier 5 is free to rotate in the clockwise direction 31. That is, the sprocket carrier 5 and the drive sleeve 6 are free to rotate in the clockwise direction 31, or freewheel, relative to the rotation of the hub sleeve 3. Pawl arrangements, used in bicycle hubs to permit freewheeling, are well known in the art and will therefore not be discussed further here.

FIG. 4 shows a typical bicycle having a freewheel hub 1, a rear wheel 32 and a front wheel 33. The wheels 32 and 33 are preferably attached to a frame 34. Counterclockwise rotation of a pulley-like chain and pedal system can cause the rear wheel 32 to also rotate in the counterclockwise direction 30. In other words, the pedals 35 are preferably attached to the hub of a pedal sprocket 36, the outside of which pedal sprocket 36 preferably engages a chain 37. The chain 37 is preferably also engaged with the freewheel hub 1 of the rear wheel 32. A derailleur arrangement, which can be used to guide the chain 37 onto sprockets carried on the freewheel hub 1, is not shown. The counterclockwise rotation 30 of the rear wheel 32 sets the front wheel 33 into synchronous motion.

A seat 38, attached to the frame, is preferably provided for the comfort of the rider of the bicycle. Handlebars 39 are also provided for steering purposes, and a manual shifting device 40 is provided for shifting from low to high gears and vice versa. That is, the manual shifting device 40, when adjusted by the rider, preferably triggers a change in the position of the derailleur arrangement, located in the vicinity of the freewheel hub 1, by means of cables (not shown). The change in the position of the derailleur arrangement can cause the chain 37 to shift from one sprocket, carried on the freewheel hub 1, to another sprocket, resulting in a gear change.

The advantage of the two-part construction of the drive part, including the sprocket carrier 5 and the drive sleeve 6, results in the simplification of the manufacturing process. In particular the ability to cold press, cold-mold or extrude the pawl gearing 8 and the driving gearing 7 simplifies manufacturing of the freewheel hub 1. When the drive sleeve 6 is being manufactured, the extrusion process can be used to manufacture the pawl gearing 8 and the inside driving gearing 12 in a single process, in which case there are essentially no centering problems. A lathe-turning operation is essentially all that is required to machine the rest of the functions or features into the part. The same is true for the sprocket carrier 5 with its external driving gearing 7. In that case, after the manufacture of the extruded blank with the finished driving gearing 7, a lathe-turning operation is essentially all that is necessary to obtain the finished part.

That is, the sprocket carrier 5 and the drive sleeve 6 can be advantageously combined to form a two-part drive part, using a simplified manufacturing process. The drive sleeve 6, including both pawl gearing 8 and inner driving gearing 12, can easily and economically be manufactured using a cold pressing, cold molding or extrusion process, with only minor machining required to complete the drive sleeve 6. The sprocket carrier 5, having driving gearing 7, can also be easily and economically manufactured using the cold pressing, cold molding or extrusion process. Again, only minor machining should be required to produce the completed sprocket carrier 5. Since a significant portion of the features to be manufactured into both the sprocket carrier 5 and drive sleeve 6 can be performed using the simple and economical plastic deformation (cold pressing, cold molding or extrusion) processes, the manufacturing of the drive part can be both easy and economical. That is, high cost machining or material removal to create the pawl gearing 8 and the inner driving gearing 12, in the drive sleeve 6, and the driving gearing 7, on the sprocket carrier 5 can be reduced since the low cost plastic deformation process can provide parts with the requisite shape and tolerances so that only minimal machining should be required to complete the finished parts.

One feature of the invention resides broadly in the freewheel hub 1 for bicycles, including a hub axle 2, a hub sleeve 3, a plurality of roller bearings 4, a sprocket carrier 5 with driving gearing 7, a pawl carrier 10 which is connected to the hub sleeve 3, and at least one detent pawl 9 located on this pawl carrier 10, characterized by non-rotationally connecting the inner driving gearing 12 at one end of the drive sleeve 6 to the driving gearing 7 of the sprocket carrier 5, such that the inner driving gearing 12 of the drive sleeve 6 interacts or meshes with the driving gearing 7 of the sprocket carrier 5. The drive sleeve 6 can then be axially fixed in position, in one direction, by means of a recess 11b on the drive sleeve 6 which is in contact with a collar means 11a on the sprocket carrier 5.

Another feature of the invention resides broadly in the freewheel hub 1 for bicycles characterized by the fact that a first gasket 13 is located in a groove above the tooth heads of the driving gearing 7 on the end surface of the drive sleeve 6 on the outside of the hub.

Yet another feature of the invention resides broadly in the freewheel hub 1 characterized by the fact that the drive sleeve 6 has a second gasket 14 which is in contact with the inside cylindrical surface of the hub sleeve 3.

Still another feature of the invention resides broadly in the freewheel hub 1 for bicycles characterized by the fact that the drive sleeve 6 has an internal gearing 8 for the engagement of at least one detent pawl 9.

Examples of bicycle hubs and related components therefore which may be utilized in accordance with the present invention may be found in the following documents: U.S. patent application Ser. No. 08/535624 filed on Sep. 28, 1995 entitled "Derailleur Arrangement, in Particular for Bicycles", having inventor Bodmer, which corresponds to Federal Republic of Germany patent application No. P 44 34 752.9, filed on Sep. 29, 1994, which corresponds to DE-OS 44 34 752 and DE-PS 44 34 752; U.S. patent application Ser. No. 08/430502 filed on Apr. 28, 1995 entitled "A Shifting Arrangement for a Change Gear Drive in Multispeed Hubs for Bicycles", having inventor Meier-Burkamp, which corresponds to Federal Republic of Germany patent application No. P 44 15 266.3, filed on Apr. 30, 1994, which corresponds to DE-OS 44 15 266 and DE-PS 44 15 266; U.S. patent application Ser. No. 08/377476 filed on Jan. 24, 1995 entitled "Multispeed Hub for a Bicycle", having inventors Meier-Burkamp and Steuer, which corresponds to Federal Republic of Germany patent application No. P 44 02 344.8, filed on Jan. 27, 1994, which corresponds to DE-OS 44 02 344 and DE-PS 44 02 344; U.S. Pat. application Ser. No. 08/374950 filed on Jan. 18, 1995 entitled "Multiple Sprocket Chainwheel for Bicycle Derailleur", having inventors Schmidt, Neuer, Dumbser and Bodmer, to be issued as U.S. Pat. No. 5,522,611 on Jun. 4, 1996, which corresponds to Federal Republic of Germany patent application No. P 44 01 272.1, filed on Jan. 18, 1994, which corresponds to DE-OS 44 01 272 and DE-PS 44 01 272; U.S. Pat. application Ser. No. 08/351763 filed on Dec. 8, 1994 entitled "A Multi-speed Hub for Bicycles", having inventor Meier-Burkamp, which corresponds to Federal Republic of Germany patent application No. P 43 42 347.7, filed on Dec. 11, 1993, which corresponds to DE-OS 43 42 347 and DE-PS 43 42 347; U.S. patent application Ser. No. 08/304136 filed on Sep. 12, 1994 entitled "Derailleur Arrangement, in Particular for Bicycles", having inventors Neuer and Bodmer, issued as U.S. Pat. No. 5,503,598 on Apr. 2, 1996, which corresponds to Federal Republic of Germany patent application No. P 43 30 989.5, filed on Sep. 13, 1993, which corresponds to DE-OS 43 30 989 and DE-PS 43 30 989; and U.S. patent application Ser. No. 08/231308 filed on Apr. 22, 1994 entitled "Bicycle & Bicycle with Multispeed Wheel Hub", having inventor Nurnberger, issued as U.S. Pat. No. 5,443, 279 on Aug. 22, 1995, which corresponds to Federal Republic of Germany patent application No. P 43 13 558.7, filed on Apr. 26, 1993, which corresponds to DE-OS 43 13 558 and DE-PS 43 13 558. These patents and patent applications and their corresponding published patent applications, as well as their published equivalents, and other equivalents or corresponding applications, if any, and the references cited in any of the documents, publications, patents, and published patent applications cited herein, are hereby incorporated by reference as if set forth in their entirety herein. All of the above U.S. patent documents in this paragraph are assigned to Fichtel & Sachs AG of the Federal Republic of Germany.

Examples of bicycle hub arrangements, which may be utilized in accordance with the embodiments of the present invention, may be found in the following U.S. Pat. No. 5,458,223, which issued to Chen on Oct. 17, 1995; U.S. Pat. No. 5,456,537, which issued to Wang on Oct. 10, 1995; U.S. Pat. No. 5,451,097, which issued to Fu et al. on Sep. 19, 1995; U.S. Pat. No. 5,383,729, which issued to Hsieh on Jan. 24, 1995; U.S. Pat. No. 5,332,294, which issued to Haeussinger on Jul. 26, 1994; and U.S. Pat. No. 4,913,500, which issued to Wauke et al. on Apr. 3, 1990.

Examples of bicycle freewheel arrangements, which may be utilized in accordance with the embodiments of the present invention, may be found in the following U.S. Pat. No. 5,426,997, which issued to Brion on Jun. 27, 1995; U.S. Pat. No. 5,303,605, which issued to Douglass on Apr. 19, 1994; and U.S. Pat. No. 5,301,778, which issued to Haeussinger on Apr. 12, 1994.

Examples of pawl arrangements for bicycles, which may be utilized in accordance with the embodiments of the present invention, may be found in the following U.S. Pat. No. 5,460,254, which issued to Huang on Oct. 24, 1995; U.S. Pat. No. 5,433,306, which issued to Yang on Jul. 18, 1995; U.S. Pat. No. 5,322,487, which issued to Nagano on Jun. 21, 1994; and U.S. Pat. No. 5,143,189, which issued to Meier-Burkamp on Sep. 1, 1992.

Examples of extrusion processes or arrangements, which may be utilized in accordance with the embodiments of the present invention, may be found in the following U.S. Pat. No. 5,397,514, which issued to Breil et al. on Mar. 14, 1995; U.S. Pat. No. 5,393,536, which issued to Brandt et al. on Feb. 28, 1995; U.S. Pat. No. 5,387,386, which issued to Kirjavainen on Feb. 7, 1995; and U.S. Pat. No. 4,921,664, which issued to Couper on May 1, 1990.

Examples of cold pressing processes or arrangements, which may be utilized in accordance with the embodiments of the present invention, may be found in the following U.S. Pat. No. 5,429,781, which issued to Montgomery on Jul. 4, 1995; U.S. Pat. No. 5,262,103, which issued to LaPoint on Nov. 16, 1993; U.S. Pat. No. 5,066,351, which issued to Knoll on Nov. 19, 1991; U.S. Pat. No. 4,993,932, which issued to D'Andrade on Feb. 19, 1991; U.S. Pat. No. 4,948,355, which issued to Knoll on Aug. 14, 1990; and U.S. Pat. No. 4,941,341, which issued to Kellner on Jul. 17, 1990.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign patent publication applications, namely, Federal Republic of Germany Patent Application No. 195 18 676.1, filed on May 22, 1995, having inventors Peter Kröger, Klaus König, Guillaume Crosnier, and DE-OS 195 18 676.1 and DE-PS 195 18 676.1

The invention as described hereinabove in the context of the preferred embodiments is not to be taken as limited to all of the provided details thereof, since modifications and variations thereof may be made without departing from the spirit and scope of the invention.

What is claimed is:

1. A bicycle freewheel hub, said bicycle freewheel hub comprising:

a hub axle defining a longitudinal axis;

a hub sleeve;

bearings for mounting said hub sleeve on said hub axle;

a bicycle sprocket carrier for receiving bicycle sprockets;

said bicycle sprocket carrier being disposed on said hub axle;

said bicycle sprocket carrier having outer driving projections to mesh with bicycle sprockets;

a pawl carrier connected to said hub sleeve;

at least one detent pawl disposed on said pawl carrier;

a drive sleeve having inner driving projections;

said inner driving projections of said drive sleeve being configured to non-rotationally mesh with said outer driving projections of said bicycle sprocket carrier;

said bicycle sprocket carrier comprising collar means;

said drive sleeve comprising recess means;

said drive sleeve being axially fixed in position, in a first axial direction with respect to the longitudinal axis of said hub axle, by said recess means of said drive sleeve;

said recess means being disposed in contact with said collar means of said bicycle sprocket carrier;

means for fixing said drive sleeve in a second axial direction with respect to the longitudinal axis of said hub axle;

the second axial direction being opposite to the first axial direction;

said means for fixing said drive sleeve in a second axial direction comprising a first groove and a first gasket;

said first groove being disposed substantially above said outer driving projections of said bicycle sprocket carrier;

said drive sleeve comprising an end surface;

said end surface of said drive sleeve being disposed adjacent to said inner driving projections of said drive sleeve;

said first gasket being disposed in said first groove; and said first gasket being disposed adjacent to said end surface of said drive sleeve.

2. The bicycle freewheel hub according to claim 1, wherein:

said drive sleeve comprises an outer surface;

said hub sleeve comprises an inside cylindrical surface;

said outer surface of said drive sleeve being disposed substantially adjacent to said inside cylindrical surface of said hub sleeve;

said hub sleeve being disposed to provide a gap between said outer surface of said drive sleeve and said inside cylindrical surface of said hub sleeve;

said bicycle freewheel hub comprising means for sealing disposed in said gap;

said means for sealing comprises a second groove and a second gasket;

said second groove being disposed on said outer surface of said drive sleeve; and said second gasket being disposed in said second groove to seal said gap.

3. The bicycle freewheel hub according to claim 2, wherein:

said drive sleeve comprises an inner surface;

said inner surface being disposed opposite said outer surface of said drive sleeve;

said inner surface being further disposed substantially adjacent to said recess means of said drive sleeve;

said inner surface of said drive sleeve comprises internal cogs; and said internal cogs being disposed for engaging said at least one detent pawl.

4. A bicycle freewheel hub, said bicycle freewheel hub comprising:

a hub axle defining a longitudinal axis;

a hub sleeve;

bearings for mounting said hub sleeve on said hub axle;

a bicycle sprocket carrier for receiving bicycle sprockets;

said bicycle sprocket carrier being disposed on said hub axle;

said bicycle sprocket carrier having outer driving projections to mesh with bicycle sprockets;

a pawl carrier connected to said hub sleeve;

at least one detent pawl disposed on said pawl carrier;

a drive sleeve having inner driving projections;

said inner driving projections of said drive sleeve being configured to non-rotationally mesh with said outer driving projections of said bicycle sprocket carrier;

said bicycle sprocket carrier comprising collar means;

said drive sleeve comprising recess means;

said drive sleeve being axially fixed in position, in a first axial direction with respect to the longitudinal axis of said hub axle, by said recess means of said drive sleeve;

said recess means being disposed in contact with said collar means of said bicycle sprocket carrier;

said drive sleeve comprising an outer surface;

said hub sleeve comprising an inside cylindrical surface;

said outer surface of said drive sleeve being disposed substantially adjacent to said inside cylindrical surface of said hub sleeve;

said hub sleeve being disposed to provide a gap between said outer surface of said drive sleeve and said inside cylindrical surface of said hub sleeve;

means for sealing being disposed in said gap;

said means for sealing comprising a second groove and a second gasket;

said second groove being disposed on said outer surface of said drive sleeve; and said second gasket being disposed in said second groove to seal said gap.

5. The bicycle freewheel hub according to claim 1, wherein:

said drive sleeve comprises an inner surface;

said inner surface being disposed substantially adjacent to said recess means of said drive sleeve;

said inner surface of said drive sleeve comprises internal cogs; and said internal cogs being disposed for engaging said at least one detent pawl.

6. In a bicycle freewheel hub, a bicycle drive assembly comprising:

a bicycle sprocket carrier for receiving bicycle sprockets;

said bicycle sprocket carrier having a longitudinal axis;

said bicycle sprocket carrier having outer driving projections to mesh with bicycle sprockets;

a drive sleeve having inner driving projections;

said inner driving projections of said drive sleeve being configured to non-rotationally mesh with said outer driving projections of said bicycle sprocket carrier;

said bicycle sprocket carrier comprising a collar;

said drive sleeve comprising a recess;

said drive sleeve being axially fixed in position, in a first axial direction with respect to the longitudinal axis of said bicycle sprocket carrier, by said recess of said drive sleeve;

said recess being disposed in contact with said collar of said bicycle sprocket carrier;

an arrangement to fix said drive sleeve in a second axial direction with respect to the longitudinal axis of said bicycle sprocket carrier;

the second axial direction being opposite to the first axial direction;

said arrangement to fix said drive sleeve in a second axial direction comprising a first groove and a first gasket;

said first groove being disposed substantially above said outer driving projections of said bicycle sprocket carrier;

said drive sleeve comprising an end surface;

said end surface of said drive sleeve being disposed adjacent to said inner driving projections of said drive sleeve;

said first gasket being disposed in said first groove; and said first gasket being disposed adjacent to said end surface of said drive sleeve.

7. The bicycle drive assembly according to claim 6, wherein:

said drive sleeve comprises an outer surface;

said bicycle drive assembly comprises an arrangement to seal said bicycle drive assembly with a bicycle freewheel hub sleeve;

said arrangement to seal comprises a second groove and a second gasket;

said second groove being disposed on said outer surface of said drive sleeve; and said second gasket being disposed in said second groove.

8. The bicycle drive assembly according to claim 7, wherein:

said drive sleeve comprises an inner surface;

said inner surface being disposed opposite said outer surface of said drive sleeve;

said inner surface being further disposed substantially adjacent to said recess of said drive sleeve;

said inner surface of said drive sleeve comprises internal cogs; and said internal cogs being disposed for engaging at least one detent pawl of a bicycle freewheel hub sleeve.

9. In a bicycle freewheel hub, a bicycle drive assembly comprising:

a bicycle sprocket carrier for receiving bicycle sprockets;

said bicycle sprocket carrier having a longitudinal axis;

said bicycle sprocket carrier having outer driving projections to mesh with bicycle sprockets;

a drive sleeve having inner driving projections;

said inner driving projections of said drive sleeve being configured to non-rotationally mesh with said outer driving projections of said bicycle sprocket carrier;

said bicycle sprocket carrier comprising a collar;

said drive sleeve comprising a recess;

said drive sleeve being axially fixed in position, in a first axial direction with respect to the longitudinal axis of said bicycle sprocket carrier, by said recess of said drive sleeve;

said recess being disposed in contact with said collar of said bicycle sprocket carrier;

said drive sleeve comprising an outer surface;

an arrangement to seal said bicycle drive assembly with a bicycle freewheel hub sleeve;

said arrangement to seal comprising a second groove and a second gasket;

said second groove being disposed on said outer surface of said drive sleeve; and said second gasket being disposed in said second groove.

10. The bicycle drive assembly according to claim 6, wherein:

said drive sleeve comprises an inner surface;

said inner surface being disposed substantially adjacent to said recess of said drive sleeve;

said inner surface of said drive sleeve comprises internal cogs; and said internal cogs being disposed for engaging at least one detent pawl of a bicycle freewheel hub sleeve.

* * * * *